US011775670B2

(12) United States Patent
Ziv et al.

(10) Patent No.: US 11,775,670 B2
(45) Date of Patent: Oct. 3, 2023

(54) SYSTEM AND METHOD FOR LIGHT DATA FILE DUPLICATION PREVENTION

(71) Applicant: Proofpoint, Inc., Sunnyvale, CA (US)

(72) Inventors: Guy Ziv, Holon (IL); Boris Traktirnik, Ashdod (IL); Nir Barak, Karmei Yosef (IL); Tai Tikotzki, Ramat Gan (IL); Sagi Schechter, Andover, MA (US); Rotem Gingold, Tel Aviv (IL)

(73) Assignee: Proofpoint, Inc., Sunnyvale, CA (US)

( * ) Notice: Subject to any disclaimer, the term of this patent is extended or adjusted under 35 U.S.C. 154(b) by 28 days.

(21) Appl. No.: 17/231,484

(22) Filed: Apr. 15, 2021

(65) Prior Publication Data

US 2022/0335149 A1    Oct. 20, 2022

(51) Int. Cl.
| | | |
|---|---|---|
| *G06F 21/62* | (2013.01) | |
| *G06F 9/451* | (2018.01) | |
| *G06F 3/0486* | (2013.01) | |
| *G06F 3/0481* | (2022.01) | |
| *G06F 16/17* | (2019.01) | |
| *G06F 9/54* | (2006.01) | |
| *G06F 16/16* | (2019.01) | |

(52) U.S. Cl.
CPC ........ *G06F 21/6227* (2013.01); *G06F 3/0481* (2013.01); *G06F 3/0486* (2013.01); *G06F 9/451* (2018.02); *G06F 9/545* (2013.01); *G06F 16/1734* (2019.01); *G06F 16/16* (2019.01); *G06F 21/6209* (2013.01); *G06F 21/6218* (2013.01); *G06F 2221/2147* (2013.01)

(58) Field of Classification Search
CPC ............ G06F 21/6209; G06F 21/6218; G06F 21/6227; G06F 2221/2141; G06F 2221/2147; G06F 2221/2149; G06F 16/1734; G06F 16/16; G06F 9/451; G06F 9/545; G06F 3/0481; G06F 3/0486
See application file for complete search history.

(56) References Cited

U.S. PATENT DOCUMENTS

| | | | | |
|---|---|---|---|---|
| 8,161,014 | B1 * | 4/2012 | Allen ................. | G06F 21/6218 707/694 |
| 2004/0207600 | A1 * | 10/2004 | Zhang .................. | G06F 3/0425 345/175 |
| 2009/0232300 | A1 * | 9/2009 | Zucker ................ | G06F 21/6209 380/2 |

(Continued)

FOREIGN PATENT DOCUMENTS

WO       2020142654 A1    7/2020

*Primary Examiner* — Daniel Samwel
(74) *Attorney, Agent, or Firm* — Sheehan Phinney Bass & Green PA

(57) ABSTRACT

A system for preventing duplication of a computer source file to a destination file includes a user application accessed by a user of a computer. An agent application hosted by the computer registers for a notification of a user interface action with an operating system (OS) of the computer. The agent receives notice from the OS of the user interface action and determines if the user interface action is indicative of a data file duplication operation of a source file to a destination file location The Agent compares a property of the source file and a property of the destination file location to a blocking criteria, and blocks the user interface action from reaching the application.

18 Claims, 6 Drawing Sheets

(56) References Cited

U.S. PATENT DOCUMENTS

| | | | |
|---|---|---|---|
| 2010/0149090 A1* | 6/2010 | Morris | G06F 3/017 |
| | | | 345/156 |
| 2010/0162347 A1* | 6/2010 | Barile | G06F 21/552 |
| | | | 726/1 |
| 2011/0239306 A1* | 9/2011 | Avni | G06F 21/62 |
| | | | 726/26 |
| 2014/0337595 A1* | 11/2014 | Ura | G06F 3/0683 |
| | | | 711/162 |
| 2017/0154188 A1* | 6/2017 | Meier | G06F 21/552 |
| 2017/0180424 A1* | 6/2017 | Hardee | H04L 67/06 |
| 2019/0147086 A1* | 5/2019 | Pal | G06F 16/24535 |
| | | | 707/718 |
| 2020/0103967 A1* | 4/2020 | Bar-Zeev | G06F 3/015 |

* cited by examiner

SYSTEM AND METHOD FOR LIGHT DATA FILE DUPLICATION PREVENTION

FIELD OF THE INVENTION

The present invention relates to data security, and more particularly, is related to preventing unauthorized file duplication operations.

BACKGROUND OF THE INVENTION

Many organizations wish to protect sensitive computer data files. However, it can be difficult to prevent unauthorized data file duplications from company computing devices, for example, replicating data files from a memory location managed by the organization onto an external memory location not controlled by the organization, such as a removable drive (USB thumb drive) or to a network/cloud destination.

Atomic prevention of a data file duplication is not practical at the driver level because file duplication is not an atomic action. Instead, a user application may implement file duplication operations at its own discretion, making kernel level detection and prevention difficult or impossible. Previous solutions attempted to prevent a user file duplication action based solely upon source file properties, for example, by using code injection or blocking of any file creation event. The code injection method may be intrusive to a context of a running process, possibly crashing of the process (application) or causing compatibility issues. Further, code injection may require whitelisting to other techniques while working in a protected environment including Antivirus and Antimalware solutions. Blocking of any file create event, while possibly safer than code injection, may block events other than a file duplication, or may not be specific enough as the block is based on information on the source file information that is not available since file duplication is an application level event which may not be done in an atomic way. Further, after-the-fact recognition of a source file property may not prevent the file duplication action. Therefore, there is a need in the industry to address one or more of the abovementioned shortcomings.

SUMMARY OF THE INVENTION

Embodiments of the present invention provide a system and method for light data file duplication prevention. Briefly described, the present invention is directed to a system for preventing duplication of a computer source file to a destination file. A user application is accessed by a user of a computer. An agent application hosted by the computer registers for a notification of a user interface action with an operating system (OS) of the computer. The agent receives notice from the OS of the user interface action and determines if the user interface action is indicative of a data file duplication operation of a source file to a destination file location The Agent compares a property of the source file and a property of the destination file location to a blocking criteria, and blocks the user interface action from reaching the application.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principals of the invention.

DETAILED DESCRIPTION

Figure 1:
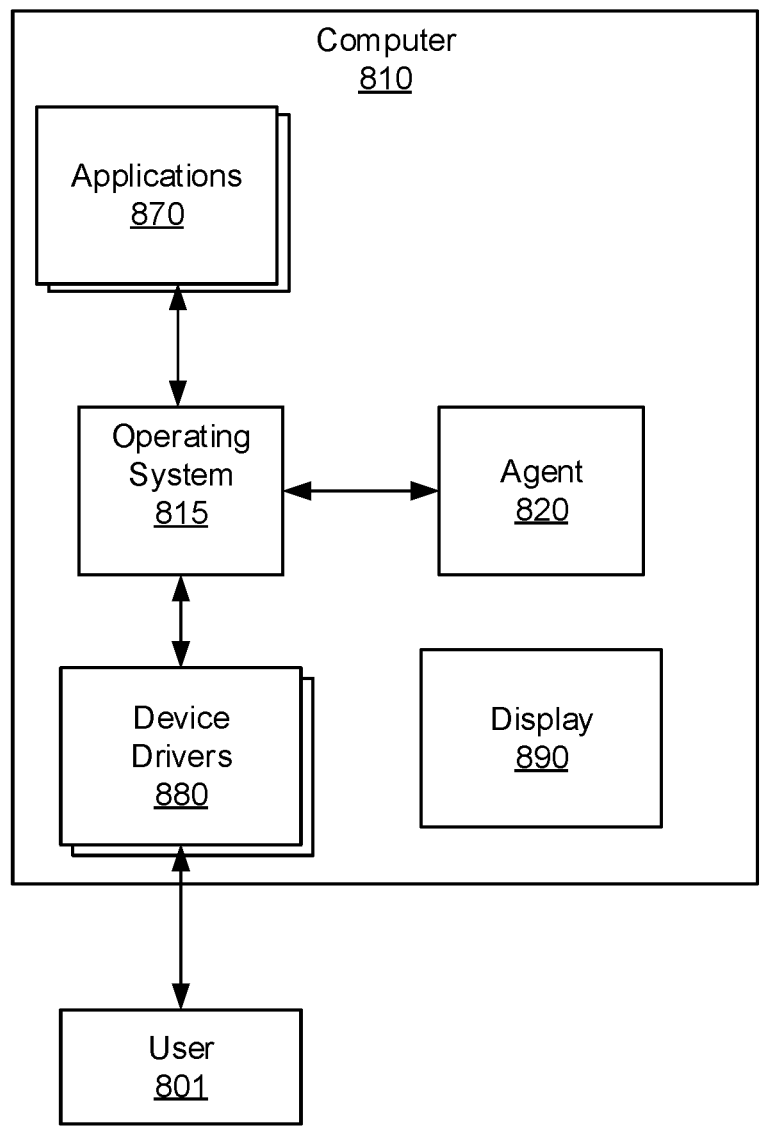
FIG. 1 is a schematic block diagram of a computer accessed by a user under a first embodiment of the present invention.

The following definitions are useful for interpreting terms applied to features of the embodiments disclosed herein, and are meant only to define elements within the disclosure.

As used within this disclosure, a "data file duplication" operation generally refers to the overall process of creating a separately located duplicate of a source file. The data file duplication may be broken down into two mid-level operations: a copy file operation and a paste file operation. The copy file operation is directed to a source file at a first location, and the file paste operation is directed to a destination file at a second location. The copy file operation includes receiving a user selection of a source file stored at a first location ("source file location"). The paste operation includes receiving a user selection of a second location ("destination location") different from the source file location. The destination location specifies where a duplicate of the source file is to be created. The paste operation further involves creation of the destination file ("file create event"), and writing of the source file data to the destination file. In some cases, the file duplication operation also involves copying a reference to the source file to an intermediate storage location, such as a buffer or cache (for example, a "clipboard" of the operating system), before the source file data is written to the destination file.

As used within this disclosure, a "file duplication block," a "blocking action," "blocking," and "block" refers to the prevention of a file duplication operation before any data from the source file is written to the destination location, preferably before a destination file is created at the destination location. In the embodiments described below, the block may implemented by preventing an application from receiving a user interface action indicative of a file duplication.

As used within this disclosure, a "controller of a graphical user interface pointer" refers to any physical user interface device or user sensor configured to control a graphical pointer object for a two dimensional (2D) or three dimensional (3D) graphical user interface, for example but not limited to a mouse, trackpad, track point, track button, track knob, trackball, and a gesture and/or motion sensor of, for example, a virtual reality (VR) headset. Such devices may be wired or wireless.

As used within this disclosure, a "user interaction with the controller of the graphical user interface pointer" includes one or more of a click, a click-and-release, a click-and-hold, a click-and-drag, and a click-and-drag-and-release ("drag-and-drop").

As used within this disclosure, a "user keyboard action" refers to the detected pressing of one or more keys on a keyboard computer interface, whether wired or wireless. A keyboard action may involve a combination of a character key and a control key, such as control/command, alt, meta, or shift, among others. Likewise, a user keyboard action may refer to a sequence of key presses, for example, the entering of a text string into a command line.

As used within this disclosure, a "user interface action" may refer to a detected user interaction with a UI device such as a character input device (keyboard) and/or the controller of the graphical user interface pointer, either alone or in combination, for example pressing and holding of a command key or other keyboard key combination while clicking with a mouse or trackpad. Other types of user interaction are also possible, for example facial and/or body gesture recognition. Analyzing a user interface action may involve determining a selected menu item during the user interface action, for example, an entry in a pop-up menu or drop-down menu in proximity of a pointer object during the user interface action, as described in the patent application PCT/US2020/012133, published as WO 2020/142654 A1, entitled "Detecting Paste and Other Types of User Activities in Computer Environment," which is incorporated by reference herein in its entirety. For example, determining a user interface action is indicative of a paste operation may include receiving an indication from a computer operating system that a user has performed a first action that may have caused a context menu with a paste option to open on a screen of the computer, and subsequently receiving an indication from the computer operating system that the user has performed a second action at the computer that may have amounted to a selection of the paste option on the context menu.

As used within this disclosure, a "blocking criteria" refers to a set of rules and/or conditions used to determine whether a data file duplication operation is to be allowed or blocked. The blocking criteria may be based on one or more properties of the source file, and/or the destination file location. Properties of the source file may include the source file location, a title of the source file, content of the source file data (for example, a listed text string), information regarding a file classification indicating whether the source file includes sensitive information, information regarding permissions needed to access the source file, and/or metadata associated with the source data file, among other properties. Properties of the destination file location may include, for example, whether the destination file location is a removable memory device (such as a thumb drive), whether the destination file location is remote (located on an external device or a network/cloud), whether the destination file location is included in an approved device list, whether the destination file location is included in an approved path list, and/or file access properties of the destination file location (permissions).

As used within this disclosure, "code injection" refers to the practice of instrumenting and/or extending OS level functions by injecting of computer code into function binaries. For example, code injection may be implemented by re-writing the in-memory code for target functions. As used within this disclosure, a "file path" or "path" refers to the general form of the name of a file or directory that specifies a unique location in a file system on a computer or computer network. The path is used by the OS to locate files in the file system.

Reference will now be made in detail to embodiments of the present invention, examples of which are illustrated in the accompanying drawings. Wherever possible, the same reference numbers are used in the drawings and the description to refer to the same or like parts. As noted in the background section, atomic prevention of a file copy is not possible at the driver level because file copy is not an atomic action, and methods involving code injection or blocking of any file create event are problematic.

As noted in the background section, atomic prevention of a data file duplication is not effective based solely upon source file properties, at the driver level, or at the kernel level. Exemplary embodiments of the present invention are directed to prevention of data file duplication operations at the user interface (UI) level via registrations with the operating system (OS) of the host computer. Under the present embodiments, prevention of a data file duplication operation, referred to herein as "blocking," is done on the UI level, for example, by detecting the paste activity using either or both of keyboard or mouse activity, or inspecting drag and drop events, listening to mouse events and inspecting dragged elements in the drop action. In general, the data file duplication operation is attempted in the context of an application in communication with the OS, where the application relies on the OS to convey the UI actions initiating the data file duplication operation. At the operating system level, the file copy portion of the data file duplication operation may be user initiated by one of several familiar types of UI activity, including a keyboard command ("control-C" or "command-C"), a mouse click (selecting a file copy operation from a menu, for example a drop-down menu or a pop-up menu), among other mechanisms. Likewise, the file paste operation may be initiated by, for example, a keyboard command ("control-V" or "command-V"), a mouse click (selecting a file paste operation from a menu, for example a drop-down menu or a pop-up menu), among other mechanisms. In a typical (unblocked) file duplication operation, the OS passes the UI activity to the application so the application proceeds with the file duplication operation upon receipt of the UI activity. However, if the duplication is to be blocked, the UI activity initiating the file duplication operation is not passed to the application.

As noted above, the file copy portion of the duplication operation includes a selection of a source file to be duplicated. Once the file copy portion is detected, information about the source file selected for the file duplication may be scanned from the OS clipboard or pasteboard for a copy and paste operation, or from the UI inspection for drag-and-drop operations. When the source file and the destination location of the duplication operation are both determined, a decision is made whether to allow the file duplication operation or not. If a determination is made to block the file duplication operation, the associated UI action (mouse and/or keyboard) is dropped instead of being passed to the application for processing.

FIG. 1 is a simplified schematic block diagram of a computer 810 accessed by a user 801 under a first embodiment of the present invention. The user generally runs one or more applications 870 hosted on or presented via the computer 810. The user 801 interacts with the computer 810 via user interface devices (not shown), for example a keyboard, a mouse, a trackpad, a microphone, among others, and the computer 810 presents information to the user 801 via a display 890 and/or an audio transducer (not shown). User input via the interface devices is received by respective device drivers 880 for the user interface devices, and the device drivers 880 convey the user input to the operating system 815, and the operating system 815 in turn interacts with the applications 870, for example, conveying the user actions to the applications 870. As described in further detail below, an agent 820 installed in the computer 810 is privy to the user interface actions of the user 801 via the operating system 815, and may intercede to prevent the user interface actions from reaching the applications 870.

Figure 2:
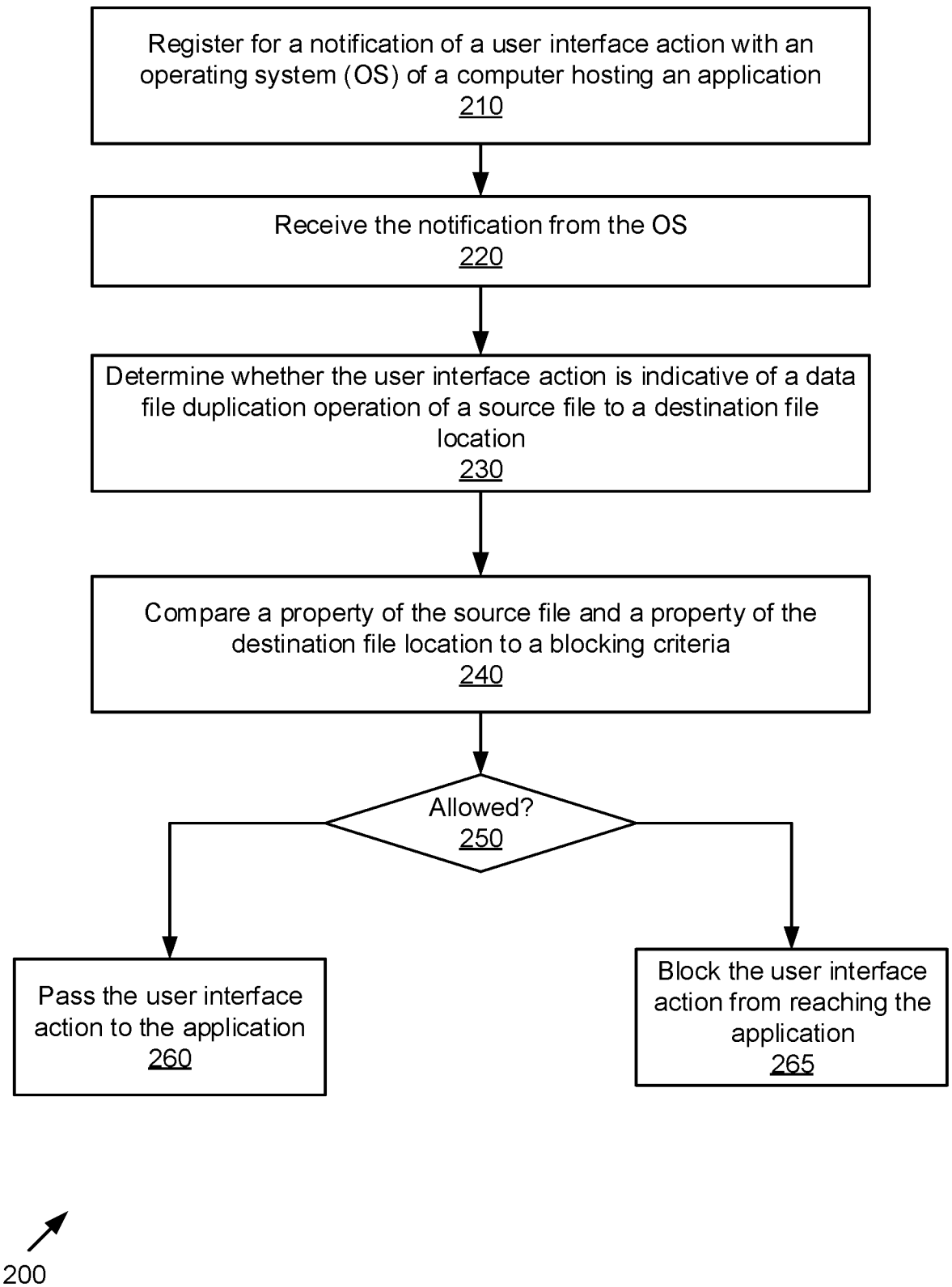
FIG. 2 is a flowchart of an exemplary first embodiment of a method for blocking a file duplication.

FIG. 2 is a flowchart 200 of a first exemplary embodiment of a method to block a data file duplication. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

Figure 6:
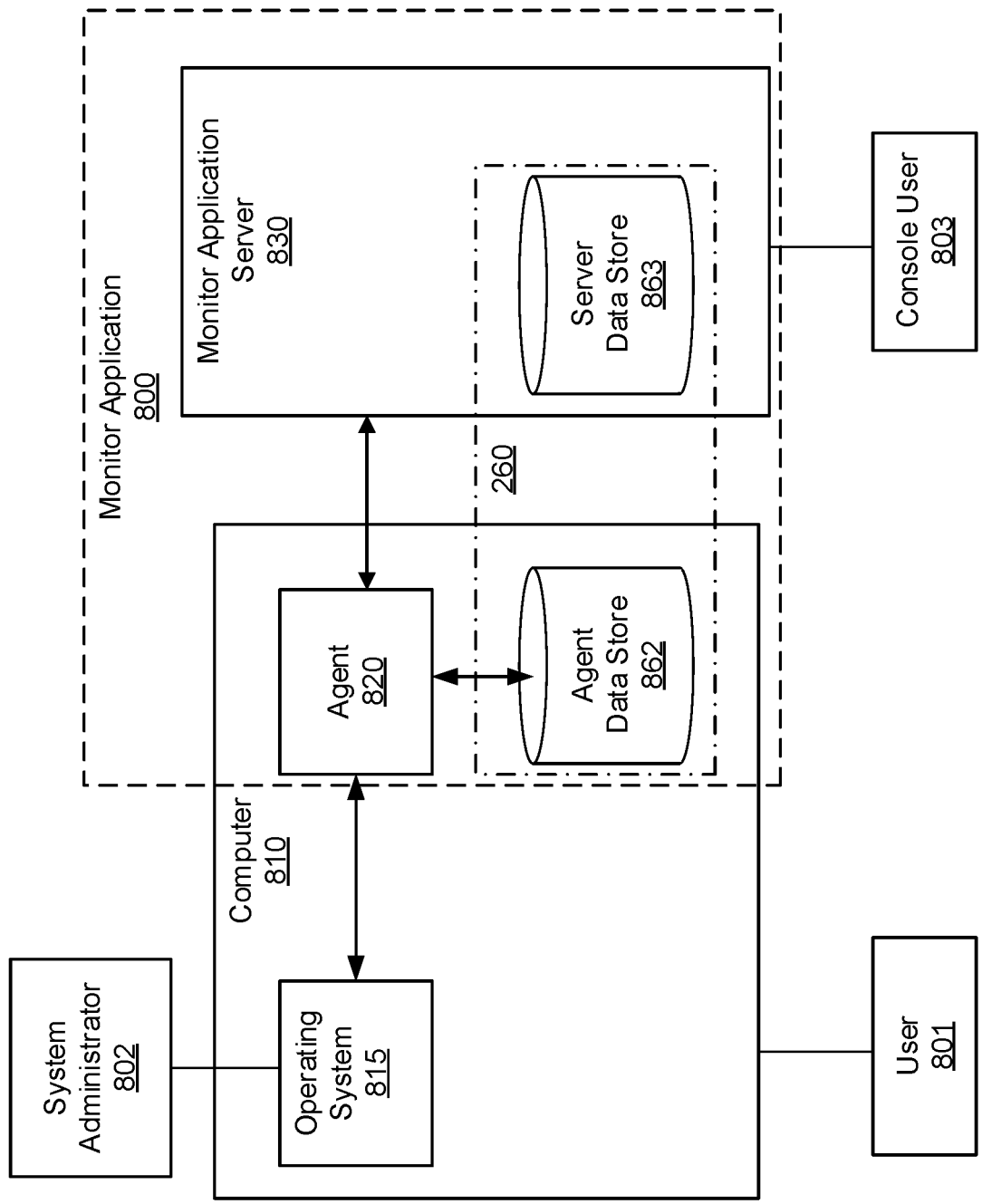
FIG. 6 is a block diagram of an embodiment of a system implementing the embodiments.

An agent 820 (FIG. 1) registers for notification of user interface actions with an operating system (OS) 815 (FIG. 1) of a computer 810 (FIG. 1) running an application 870 (FIG. 1) for a user (802), as shown by block 210. The agent 820 (FIG. 1) receives notice from the OS 815 (FIG. 1) of a user interface action associated with the registering, as shown by block 220. The agent 820 (FIG. 1), for example, on its own or in collaboration with a monitor application 800 (FIG. 6) determines whether the user interface action is indicative of a data file duplication operation of a source file to a destination file location, as shown by block 230. The agent comparing a property of the source file and a property of the destination file location to a blocking criteria, as shown by block 240. For example, the blocking criteria may be accessed from an agent data store 862 (FIG. 6) and/or a server data store 863 (FIG. 6). If the data file duplication operation is allowed, as per the blocking criteria (see block 250), the agent 820 (FIG. 1) passes the user interface action to the application 870 (FIG. 1), as shown by block 260. If the data file duplication operation is not allowed, as per the blocking criteria (see block 250), the agent 820 (FIG. 1) blocks the user interface action from reaching the application 870 (FIG. 1), as shown by block 265. The structure and operation of the agent 820 is discussed in further detail below with reference to FIG. 6.

Figure 3:
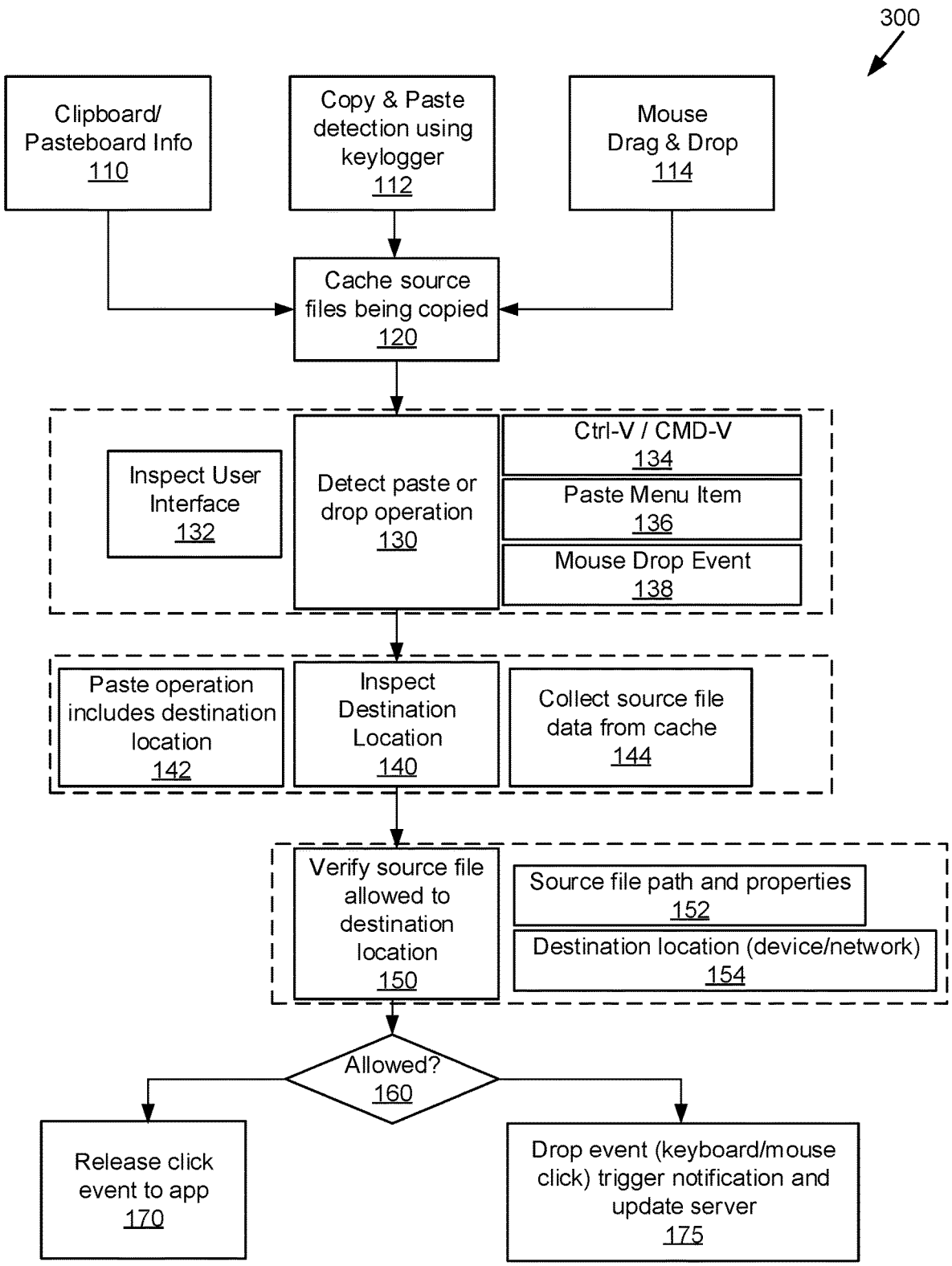
FIG. 3 shows a schematic block diagram 300 providing additional details of the process of FIG. 2.

FIG. 3 shows a schematic block diagram 300 providing additional details of the process of FIG. 2. A copy portion of a data file duplication may involve, for example, a copying of information regarding the source file to a cache, as shown by block 120, where the clipboard/pasteboard information 110 to be cached may be determined by a keylogger detecting a copy and paste operation 112, or a mouse drag-and-drop operation 114. Note, that merely copying the source file information to the cache may be insufficient to initiate block of a data file duplication operation. Determination of a block of a data file duplication operation generally occurs after a file paste or drop operation is detected, as per block 130. A file paste or drop may be determined by inspecting the user interface, as shown by block 132, or detecting a keyboard key sequence, such as Ctrl-V or Cmd-V, as shown by block 134. A file paste may be determined by detecting a user selection of a paste menu item as shown by block 136. For example, the agent 820 (FIG. 1) may receive notification of a mouse click and determine whether the mouse click coincides with the display of a pop-up menu or a drop-down menu, and if so, determining whether the mouse cursor has selected a menu item corresponding to a paste operation. A mouse drop event of a drag-and-drop may be determined by detecting a user release of a held/dragged mouse, as shown by block 138.

Once the agent 820 (FIG. 1) has determined the intent of the user is to duplicate a data file based on the notification of user action from the OS 815 (FIG. 1), the agent 820 (FIG. 1) determines the destination location for the file duplication, as shown by block 142. For example, the agent 820 (FIG. 1) may determine the destination by the mouse pointer position at the release of a drag-and-drop operation, by a file path in a command line text field, or from the context of a dialog box where the user initiated the file duplication request, among other means. The agent 820 (FIG. 1) inspects the file duplication destination location, as shown by block 140. For example, the duplication destination may be determined when pasting a file when detecting a file drop (in a drag-and-drop operation), a keyboard sequence (pressing Ctrl-V CMD-V), a menu interaction (picking paste in a menu), from a focus window or a window pointed at by the mouse pointer. A full path of the duplication destination may retrieved in several ways, including (but not limited to) by using accessibility hooks provided by the operating system. In some cases, the accessibility hooks obtain the path information from an application being used by the user.

The agent 820 (FIG. 1) collects source file information from the cache, as shown by block 144. The cache includes the full path for the source file. The agent 820 (FIG. 1) verifies whether the source file is allowed to be duplicated at the destination location, as shown by block 150. The agent 820 (FIG. 1) verifies this according to the source file data collected from the cache, and from the source file path and properties, as shown by block 152.

For example, the agent 820 may determine whether the source data file is located, for example, in a folder defined as sensitive or appears on a sensitive device. Likewise, the agent 820 determines whether properties of the source data file itself indicates the source data file is sensitive. For example, the origin of the source file may be considered, such as via mail, or an internet site. Similarly, labels that may have been applied to the source data file, for example, an MIP label. Further, the agent 820 may scan content of the source data file for sensitive information which may classify the source data file as sensitive.

The agent 820 (FIG. 1) also uses the destination file location, such as the type of file destination, for example a storage device or a network location, as shown by block 154, for example, to determine if the destination file location target is secure. The agent 820 (FIG. 1) may determine this based upon the type of media of the destination location, for example, removable disk, cloud sync folder, web site, and network share, compared with predefined rules the customer may have defined for restriction of file duplication.

For example, agent 820 (FIG. 1) may allow the file duplication regardless of the source file data if the destination location is another storage device controlled by the organization and having similar file permissions. However, if the destination location is outside the control of a system administrator 802 (FIG. 6), for example an external network location (cloud) or a removable storage device (USB stick), the agent 820 (FIG. 1) may also look to the source file data to determine whether to allow the file duplication. For example, the agent 820 (FIG. 1) may compare the source file name and file properties to a list of allowed file duplication events for permitted destinations.

If the duplication is allowed, the agent 820 (FIG. 1) releases the user paste action (for example, a mouse click) to the application 870 (FIG. 1), as shown by block 170. For example, under the win32 operating system, the SetWindowsHokExA function may be used to control the keyboard and mouse. If the duplication is not allowed, the agent 820 (FIG. 1) drops the user paste action (keyboard/mouse click), as shown by block 175. For example, upon the drop the agent 820 (FIG. 6) may trigger a notification via a user session pop-up, and/or a notification may also be provided to subscribers on the server side such as the monitor application 800 (FIG. 6), for example, a monitor application server 830 for incident exploration.

Figure 4B:
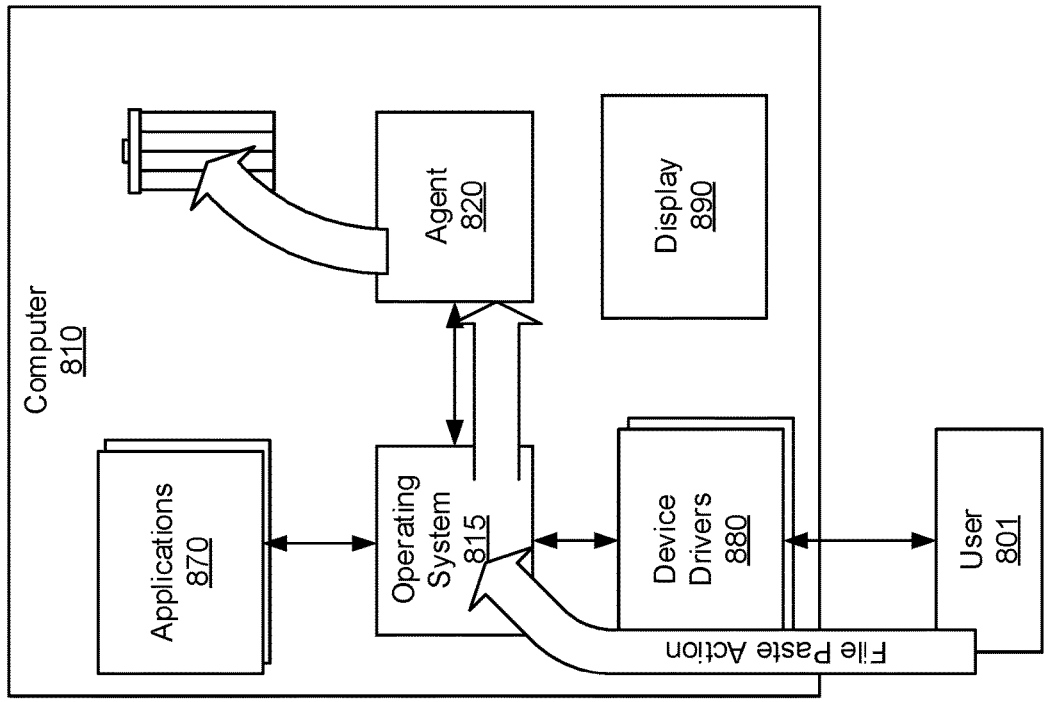
FIG. 4B is a schematic block diagram showing a path of a blocked user paste action in the computer of FIG. 1.
Figure 4A:
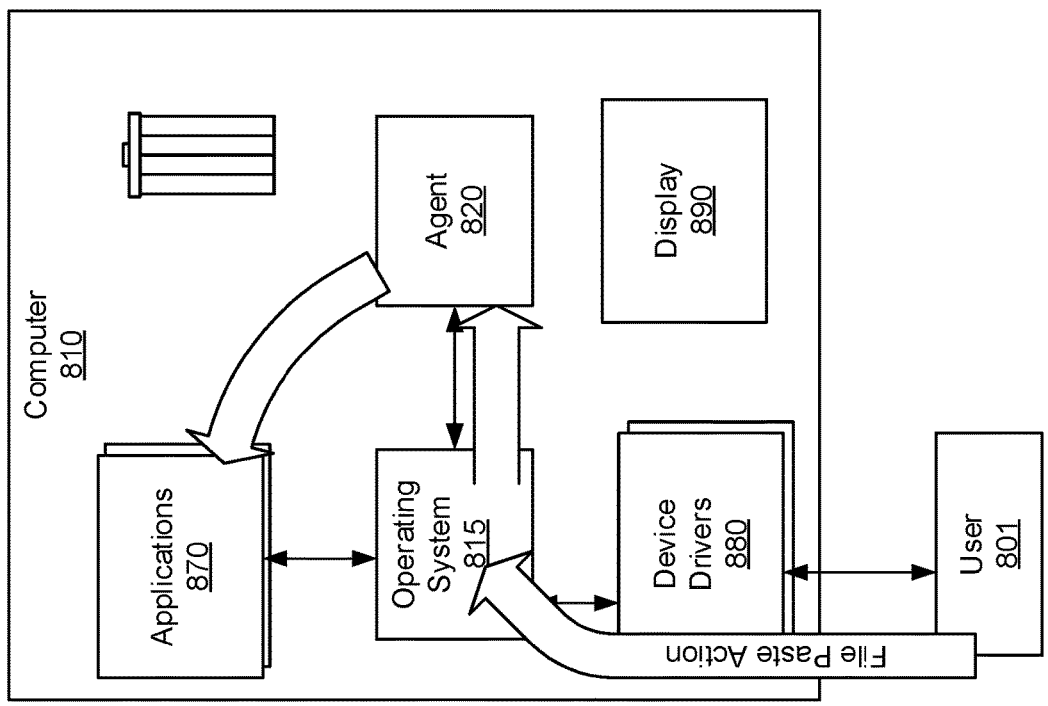
FIG. 4A is a schematic block diagram showing a path of an unblocked user paste action in the computer of FIG. 1.

FIG. 4A shows white arrows indicating a flow of an unblocked user paste action in the computer 810 of FIG. 1. A file paste action by the user 801, for example a Ctrl-V keystroke, is passed to the operating system 815 via the device driver 880, for example, a keyboard device driver. The operating system 815 passes the file paste action notification to the agent 820, based on the agent 820 having previously registered with the OS 815 for such notifications. In FIG. 4A, the agent 820 determines that the file paste action is permissible, and passes the file paste action to the application 870.

FIG. 4B shows white arrows indicating a flow of a blocked user paste action in the computer 810. A file paste action by the user 801, for example a Ctrl-V keystroke, is passed to the operating system 815 via the device driver 880, for example, a keyboard device driver. The operating system 815 passes the file paste action notification to the agent 820, based on the agent 820 having previously registered with the OS 815 for such notifications. In FIG. 4B, the agent 820 determines that the file paste action is not permissible, and drops file paste action, depicted here by forwarding the file paste action to a trashcan icon.

As clearly shown by FIGS. 4A-B, the application 870 is not privy to the decision whether to pass or block the file paste action. This clearly illustrates the advantage of the first embodiment method over code injection or blocking actions at the application level.

In one example, the user interface action may be the user entering a sequence of key presses, for example typing a text string into a command line, followed by an enter keystroke. Here, determining the user interface action is indicative of a data file duplication operation may involve parsing the text string (sequence of key presses) to determine if the text string is directed to a data file operation, such as copy, move, and/or paste.

As described below in greater detail with reference to FIG. 6, the method embodiments described below may be implemented in a system with a monitor application 800 having an agent 820 (FIG. 6) and a monitor application server. The agent 820 may be installed in a host device (for example, a computer 810 such as a desktop computer). The agent 820 is preferably implemented as an extension to the operating system (OS) 815 of the host device 810. An OS extension may leverage existing functionality of the OS 815 via one or more OS application programming interfaces (API), thereby operating in a manner consistent with the designers of the OS 815 that is unlikely to interfere with the normal operations of the host device 810.

For example, on an Apple Macintosh computer, the OS Accessibility API provides extensions so user interface devices (for example, keyboards, mice, trackpads, etc.) may be customized to accommodate users with special needs. MacOS provisioning profiles, including Accessibility, allow remote setting of permissions for actions. This option can also be granted locally manually by the user in the security and privacy option. An Accessibility OS profile provides access to events such as keystrokes, mouse clicks, and other user activities that may be leveraged to monitor usage of the host device. This provides a global OS hook to intercept user mouse and keyboard activity. Similar OS hooks are available for other operating systems. The agent 820 may be implemented as a background process, such as a daemon, which may be installed in the computer 810 by a (human) system administrator 802 in a manner that is invisible and unobtrusive to a user 801 of the host device. Further, unlike a stand-alone application, the background process may not be inadvertently (or intentionally) disabled by the user 801 who does not have system administrator privileges.

The agent 820 may be configured to monitor for specific patterns of user activity, and to log and transmit log entries to the monitor application server 830. The monitor application server 830 may then catalog the user activity in a database stored within the server data store 863, and/or scan the log entries against a table of rules to determine if the host device 810 is being used in a manner of interest/concern. A console user (human) 803 may access the monitor application server 830, for example, using a web browser.

In general, it is desirable that the agent 820 operate in an unobtrusive manner, for example, without noticeably drawing on resources of the host device 810, such as processor power, storage capacity/throughput, and/or communication bandwidth. Similarly, it is desirable that the agent operate without introducing noticeable latency in response to actions of a user.

The agent 820 is notified by the OS 815 when the user 801 performs a mouse/keyboard action or enters a command indicative of duplicating a file on the computer 810. The agent 820 uses the user action to access a collection, for example a database on the agent data store 862 containing rules for identifying sensitive files that the system administrator 802 does not want to have duplicated, as described in the embodiments below. It should be noted that actions described herein taken by the agent 820 may in practice be undertaken by the agent 820 in conjunction with the monitor application 800 and/or other external processing resources. However, for to avoid latency the check to decide whether an action should be blocked or not may be based on rules downloaded to the agent 820 and cached locally.

FIG. 6 is a schematic diagram of an exemplary distributed implementation of the monitor application 800. The monitor application 800 includes an agent 820 that is resident in the computer 810, and a monitor application server 830, which as implemented here is remote from the computer 810, for example, in communication with the agent 820 via a wired or wireless communication network such as a local area network, a wide area network, or via the internet, for example, a cloud based server. The Agent 820 may be configured to communicate with the operating system 815 of the computer 810, for example, the agent 820 may register for notifications from the operating system 815 when a specified user related activity is detected by the operating system 815. Upon receipt of a notification from the operating system 815 by the agent 820, the agent 820 may communicate notification data received from the operating system 815 to the monitor application server 830. For example, the agent 820 may forward all received notification data to the monitor application server 830, or the agent may selectively forward selected notification data to the monitor application server 830, for example the agent 820 may be configured by the monitor application server 830 with a blocking criteria to determine what notification data to forward to the monitor application server 830. The data store 860 may be distributed between an agent data store 862 resident on the computer 810 and a server data store 863 resident on the monitor application server 830.

The agent 820 may be tailored to communicate with a specific operating system 815 resident on the computer 810. For example, the agent 820 may be specific to Windows OS, MacOS, or Unix/Linux, among others. While FIG. 6 shows a single monitor application server 830, the monitor application server 830 may be distributed across two or more physical server devices. Likewise, the server data store 863 may be distributed across two or more physical server devices.

In general, the agent 820 may be configured to act as an intermediary between the operating system 815 and the monitor application server 830, in particular, the agent 820 generally conveys collected data to the monitor application server 830, and the monitor application server operates upon the collected data to determine if targeted activities have been performed by a user 801, here a human operating the computer 810. The system administrator 802 is a human who controls and configures the operating system 815 of the computer 810, and the console user 803 is a human who controls and interacts with the monitor application 800. Of course, there may be a plurality of users 801, system administrators 802, and/or console users 803, and in some circumstances a system administrator 802 and the console user 803 may be the same individual.

The flow of activity and communication between the components is as follows: The monitor application 800 includes an agent 820 which is installed locally on the computer 810. As noted above, for performance reasons the above embodiments are generally performed by the agent 820 based on rules stored in the agent data store 862. However, in some scenarios it may be desirable to apportion some of the workload to the monitor application. In such instances, the agent 820 captures user activity information, secures it, and sends the information to the monitor application server 830. In embodiments where there is more than one monitor application server 830, they may be load balanced with either a software or hardware-based device (not shown). In that case the agents 820 communicate with the load balancer's virtual IP (VIP).

Figure 5:
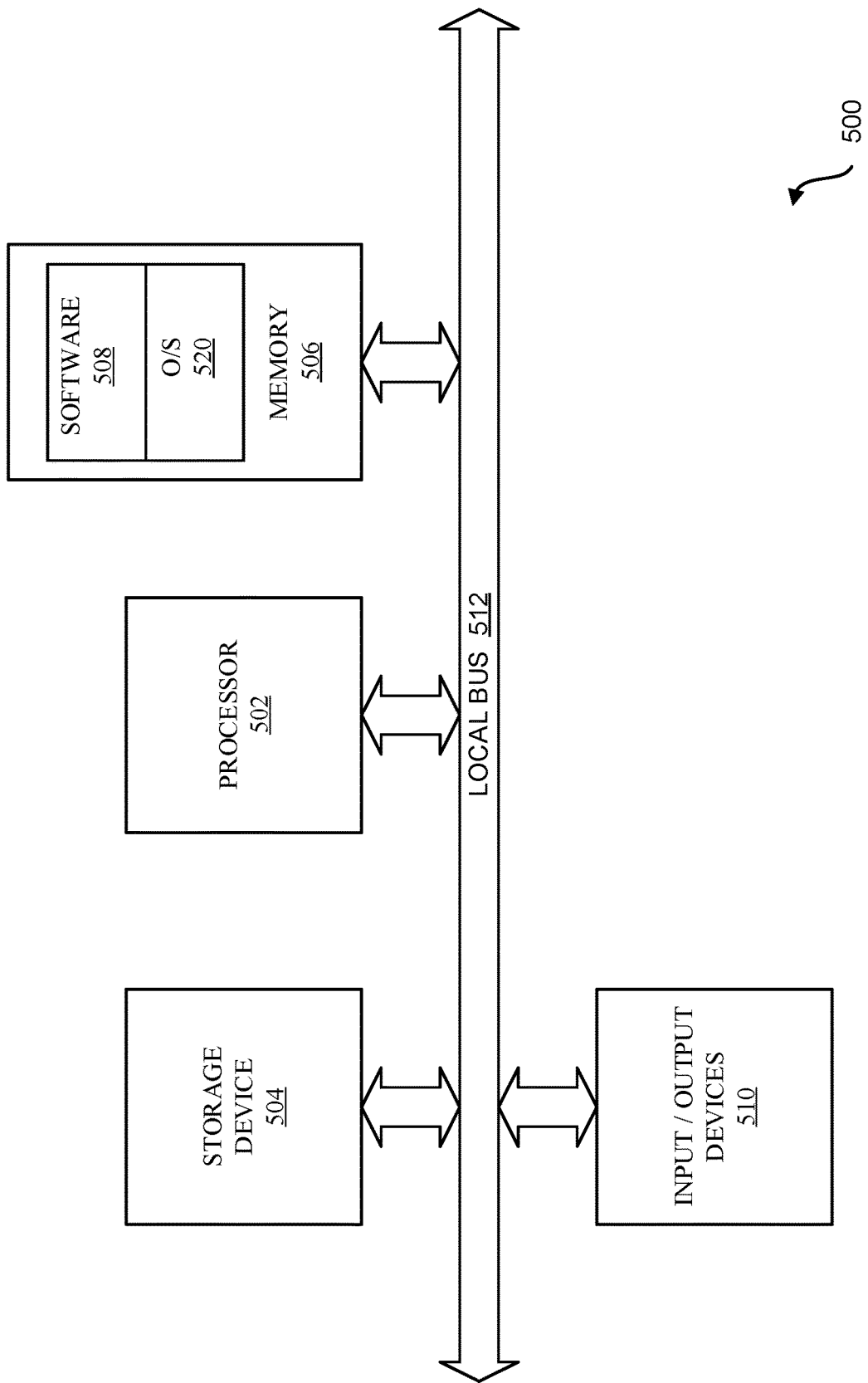
FIG. 5 is a schematic diagram illustrating an example of a system for executing functionality of the present invention.

The present system for executing the functionality described in detail above may be a computer, an example of which is shown in the schematic diagram of FIG. 5. The system 500 contains a processor 502, a storage device 504, a memory 506 having software 508 stored therein that defines the abovementioned functionality, input, and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted, or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As noted previously, it is desirable that the agent operate without introducing noticeable latency in response to actions of a user. For example, for batch file duplication and/or duplication of large data files, analysis of whether or not to block a file duplication may be noticeable to the user, for example, a time window longer than 500 ms. In such instances, the agent 820 (FIG. 1) may estimate how long the analysis may take, for example, based on the number of files and/or the amount of data to be written during a data file duplication operation. In cases where the analysis is estimated to take more than the time window allows the agent 820 (FIG. 1) first blocks the data file duplication operation, and notifies the user via the user interface, for example by presenting a pop-up informing the user the system is scanning the files. The agent 820 (FIG. 1) performs the scan in a background process. If the background process finds no issues, then the agent 820 (FIG. 1) completes the copy to the destination location. Optionally, the agent 820 (FIG. 2) may query the user regarding whether the user wishes to complete the data file duplication operation. Alternatively, the agent 820 may start a timer when the user activity indicating a file duplication is detected, and if the scan is not complete within the time window, the operation is blocked and background checked, as before.

In general, the process of moving a file is similar to the data file duplication operation, with the additional step of deleting the source file after the destination file has been created and populated with source file data, but this additional step is inconsequential to the file duplication blocking embodiments. Therefore, the embodiments herein directed to blocking of a data file duplication are also applicable to blocking a data file move. It should be noted that the file move may be initiated by a file cut operation instead of a file copy operation. A file cut operation may be initiated by, for example but not limited to, a "control-X" or "command-X" key sequence instead of a file copy operation, for example involving "control-C" or "command-C."

As used within this disclosure, "file drag-and-drop" refers to a graphical user interface (GUI) initiation of a data file duplication operation. For example, a file drag-and-drop operation may be implemented by a user selecting and dragging (for example, with a mouse or track pad) a first displayed graphical object representing a source file ("source file icon") to a displayed second graphical object representing a paste destination ("destination icon"). Here, while the user mechanism for initiating the desired data file duplication operation differs from the described embodiments, the underlying steps for the data file duplication described above are unchanged at the OS level, so the file copy block embodiments described herein are similarly applicable to a file drag-and-drop operation.

The embodiments described above are directed to a practical application for blocking duplication of sensitive computer files at the user interface level. Unlike duplication blocking techniques at the application level, the embodiments described herein improve operation of the computer by using standard OS UI events to detect the data file duplication attempt. Detection via OS UI events is not intrusive, has very low stability risk for the application, and does not introduce compatibility issues.

The embodiments provide for inspection of the source file path and properties of the file duplication action as well as destination location, and able to prevent the data file duplication action prior a destination file being created.

The data file duplication copy detection and prevention actions may be part of a user session corelated with other user actions in the session, including the agent optionally capturing one or more screenshots to log the file duplication activity. The activity reported by the agent may be used to generate alerts for later searches and/or to corelate actions later on the server side when the file duplication detect or prevention event is available to the server.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system for preventing duplication of a computer source file to a destination file, comprising:
   a computer comprising a processor and a memory;
   a user application accessed by a user via the computer;
   an agent application hosted by the computer configured to perform the steps of:
   registering with an operating system (OS) of the computer for a notification from the OS of an input event received from a controller of a graphical user interface pointer and/or a keyboard user interface;
   receiving notice from the OS of the input event associated with the registering, wherein the notice indicates detection of a detected input event consisting of one or more of the group of a keystroke, a keystroke combination, an interface pointer controller button push, an interface pointer controller button release, an interface pointer controller pointer location corresponding to the button push, and an interface pointer controller pointer location corresponding to the button release;

determining the detected input event is indicative of a user application level data file duplication operation of a source file to a destination file location; and preventing the user application from receiving the detected input event.

2. The system of claim 1, wherein the step of the agent determining the detected input event is indicative of a data file duplication operation of a source file to a destination file location further comprises detecting a data file copy action and a data file paste action.

3. The system of claim 1, wherein the agent is further configured to perform the steps of:

accessing source file properties of the source file; and
comparing the source file properties to a blocking criteria.

4. A computer based method for preventing duplication of a source file to a destination file, comprising the steps of:

registering with an operating system (OS) of a computer hosting an application for a user for a notification from the OS of an input event received from a controller of a graphical user interface pointer and/or a keyboard user interface;

receiving notice from the OS of the input event associated with the registering, wherein the notice indicates detection of a detected input event consisting of one or more of the group of a keystroke, a keystroke combination, an interface pointer controller button push, an interface pointer controller button release, an interface pointer controller pointer location corresponding to the button push, and an interface pointer controller pointer location corresponding to the button release;

determining the detected input event is indicative of a user application level data file duplication operation of a source file to a destination file location; and preventing the user application from receiving the detected input event.

5. The method of claim 4, wherein the file duplication operation comprises a data file copy.

6. The method of claim 5, wherein the file duplication operation comprises a data file paste.

7. The method of claim 4, further comprising the steps of:
accessing source file properties of the source file; and
comparing the source file properties to a blocking criteria.

8. The system of claim 1, wherein the detected user event further comprises recognition by the OS facial and/or body gesture recognition.

9. The method of claim 4, wherein the detected user event comprises at least one of the group of a click, a click-and-release, a click-and-hold, a click-and-drag, and a click-and-drag-and-release.

10. The method of claim 9, wherein the controller of the graphical user interface pointer comprises one of the group consisting of a mouse, a trackpad, a track point, a track button, a track knob, a touchscreen, and a trackball.

11. The method of claim 4, wherein determining the detected user event is indicative of a data file duplication operation of a source file to a destination file location further comprises detecting a data file copy action and a data file paste action.

12. The method of claim 11, wherein preventing the user application from receiving the detected input event comprises dropping the data file paste action.

13. The method of claim 4, further comprising the step of informing the user of the preventing the user application from receiving the detected input event.

14. The method of claim 4, wherein:
the detected input event comprises a sequence of key presses; and
determining the detected input event is indicative of a data file duplication operation further comprises the step of parsing the sequence of key presses.

15. The method of claim 4, further comprising the steps of:
estimating a time window for the determining the detected input event is indicative of a user application level data file duplication operation of a source file to a destination file location; and
if the estimated time window exceeds a predetermined threshold, notifying the user of the comparing.

16. The method of claim 4, further comprising the steps of:
comparing a property of the source file and a property of the destination file location to a blocking criteria.

17. The method of claim 16, wherein the property of the destination file location is selected from the group consisting of: indication the destination file location is on a removable memory device, indication the destination file location is external to the computer, omission of the destination file location from an approved device list of the blocking criteria, omission of a network address of the destination file location from an approved network address list of the blocking criteria, omission of a path of the destination file location from an approved path list of the blocking criteria.

18. The method of claim 4, wherein the detected user event further comprises recognition by the OS facial and/or body gesture recognition.

* * * * *